United States Patent Office 3,499,812
Patented Mar. 10, 1970

3,499,812
METHOD IN THE MANUFACTURE OF AN EXCHANGER PACKING FOR TWO FLUIDS
Ola Glav, 21 Ballstavagen, Vallentuna, Sweden
No Drawing. Continuation-in-part of application Ser. No. 531,068, Mar. 2, 1966. This application June 30, 1966, Ser. No. 561,705
Int. Cl. B31f 1/20
U.S. Cl. 156—210                    13 Claims

ABSTRACT OF THE DISCLOSURE

A porous fibrous packing, typically of coiled corrugated asbestos sheet is coated with a waterglass solution which is concentrated by washing with a water absorptive liquid such as alcohol or acetone in which the water is soluble but the silicate is not. Thereafter the thickened silicate coating may be coagulated by reacting with a salt to form an insoluble silica, or the concentrate gelatinous soluble silica can be merely dried to greatly strengthen the coated fiber with a coating which will resist cracking.

---

This application is filed as a continuation-in-part of my copending application, Ser. No. 531,068, filed Mar. 2, 1966, and now abandoned.

This invention relates to a method for the preparation of a packing for a heat or moisture exchanger body of fibrous material having parallel gas permeable cells extending across the body.

More particularly, the present invention relates to a method of bonding and structurally strengthening fibers with a stiffening coating applied as a solution thickened and hardened in situ to impart substantial bonded fibrous structural strength and stability characteristics to the cellular body.

In the preparation of heat and moisture transfer packing bodies, it is desirable to use thin-walled fibrous sheets preferably of inorganic fibers, such as asbestos, corrugated and then assembled and firmly bonded into a laminate such as by spirally winding or assembling into a rectangular block, the laminated structure of corrugated sheets having gas-permeable cells extending parallel to each other from one side of the body to an opposite side for easy fluid flow therethrough. Such body of laminated fibrous sheets, such as asbestos, are commonly used as a packing for heat and moisture transfer systems wherein different gases, each passing through different body portions of the packing may have moisture or heat absorbed from the gas passing through one portion thereof and expelling moisture or the heat absorbed from the gas into a scavenger gas simultaneously passing through another portion of the packing. Sometimes the packing is used for contact gas and liquid flowing through the porous body, separate body portions often being at substantial temperature differentials from one another. Such cellular body, moreover, is sometimes impregnated with desiccant or humectant substances such as lithium chloride, silica gel, glycerine or the like, to enhance moisture transfer effects.

In assembling their exchanger packing bodies they are wound as corrugated sheets directly or alternating with separator sheets and with temporary binders intended to hold their shapes, at least during further processing.

It has been proposed to wet such exchanger packings of the type disclosed with different solutions for purposes of causing precipitation about the fibers of impregnating chemicals such as silicates, but sheets formed of inorganic fibers and porous structure bodies, particularly asbestos, as described, are often weak and distorted and sometimes destroy in such chemical treatments.

Particularly such treatment applied to a cellular laminate such as a spirally wound corrugated sheet according to the cellular construction hereof after formation and depositing of silicate, develops cracks or flaws at the junctures between layers which are a cause of mechanical failues and particularly allow lateral interchange of fluid between the cells of the structure, in effect a substantial mechanical failure.

According to the present invention the laminated inorganic fibrous cellular structure is first treated as by dipping with a soluble bonding solution such as a soluble silicate of alkali metal, typically sodium or potassium waterglass, and that solution is then treated with a water absorbing liquid to convert the solution to an intermediate thickened, gelated or stiffened coating. The soluble silicate coating thus is converted to a semi-solid or thickened gelatinous state which imparts intermediate strength characteristics to the initial soluble silicate whereby the structure is then sufficiently strong to be treated with a final waterglass precipitating and hardening component. Thus, the intermediate treatment to remove solvent does not destroy the chemical activity of the initial coating such as waterglass with respect to precipitation to insoluble form with a final setting solution.

That intermediate solution is preferably a water-soluble polar solvent such as a lower alcohol or ketone; typically, methanol, ethanol or isopropanol, acetone or methyl ethyl ketone, formaldehyde or the like in which the aqueous solvent of the waterglass is freely miscible, but such organic liquid is generally a non-solvent for the waterglass. A consequence of that organic solvent treatment of the waterglass-impregnated exchanger body is to gelatinize and thicken the residual waterglass, removing the aqueous solvent without, however, destroy the chemical activity of the waterglass to be precipitated by various precipitants applied in a subsequent precipitating step. A similar dewatering solution may be a concentrated salt solution such as an aqueous 20 to 40% solution of an alkali metal salt; for example, sodium or potassium chloride or the like.

After treatment with the alcohol, the exchanger packing is then brought into contact with the precipitating component which is a solution or emulsion of a reagent such as a salt capable of reacting with the silicate to form an insoluble silicate. For this purpose I prefer to use various water soluble inorganic salts, typically an alkali earth metal or other soluble salts, usually halides reactive with the watergass to effect its precipitation as insoluble silicate of the applied salt. Such other metals as aluminum, tin, cobalt, chromium, iron, copper, zinc or the like may be used. Indeed, any other water-soluble salt of these metals may be applied in the precipitating solution, the metal thereof reacting with the gelatinized waterglass to precipitate the same as an insoluble silicate. Typically useful precipitating salts may be calcium chloride, magnesium chloride, aluminum chloride, zinc chloride, ferric chloride or the like. Where such soluble salt solution is applied to react with and precipitate the waterglass, it is usually applied with heat such as by immersing the packing after the waterglass is impregnated and solidified therein in a boiling aqueous solution of such setting salt.

In another aspect of this invention, the waterglass-treated packing after coagulating to a firm coating on the fibers thereof may be treated with an organic wet strength imparting agent such as an emulsified resin or resin-forming intermediate which supercoats the gelatinized waterglass. Thus, the packing after first immersing in aqueous waterglass solution and then stiffened slightly by immersion in a water miscible solvent to remove most of the water and thicken the waterglass coating is finally treated with an aqueous solution containing a wet strength agent such as an emulsion of a melamine resin, an intermediate urea formaldehyde resin such as dimethylol urea in aqueous solution or an emulsion of a partially polymerized phenol aldehyde resin which coats upon the thickened waterglass impregnated packing and thus sets to a firm body upon subsequent drying.

In still another aspect of this invention the resinous suspension or solution in water described above may further contain water-soluble inorganic salts, also described above as reactable with the thickened waterglass coating on the fibers so that the second treating solution not only reacts with and precipitates the waterglass as insoluble silicate salts such as aluminum, calcium, magnesium or iron silicate as described, but the insoluble silicate per se may be further coated with the organic resin simultaneously suspended in the precipitating solution. In each such treatment the strengthened packing may be finally washed to remove residual salts and dried in air at temperatures in the range of about 100 to 300° C. which removes water, activates the silicate to moisture adsorptive and firm bonding form and sets the resin.

An exchanger packing for moisture or heat should have an average spacing between the layers or sheets more than 1.5 mms. and most suitably about 0.25 mm. If the exchanger body constitutes a contact packing in a cooling tower, all layers may be corrugated or folded, the height of the individual folds or corrugations being considerably greater such as in the range from 5 to 10 mms. The exchanger packing may also have honeycomb or the folds may stand obliquely in adjacent layers so as to create a coherent channel or pasasgeway formed between each pair of adjacent layers over the whole layer area, which channel gets a varying width from a minimum at the places of contact to twice the height of the corrugations. A contact packing of this structure is disclosed in the copending patent application Ser. No. 380,357, filed July 6, 1964, by Carl Georg Munters, and now abandoned. The two media or fluids, such as water and air, may pass through the cellular exchanger packing in counter-current or in cross-current, as is disclosed more in detail in said patent application.

The following examples illustrate the practice of this invention:

EXAMPLE I

An exchanger packing, comprising sheets of asbestos is corrugated and rolled into a spirally laminated body, forming by the corrugations passing from side to side independent fluid impermeable cells. The spirally wound body is then immersed in a 15% waterglass solution consisting of sodium waterglass having a ratio of $SiO_2$ to alkali of 2.5 to 1. The wet packing is then immersed in 95% ethanol for a period of 10 minutes whereby most of the water contained in the waterglass is absorbed in the ethanol and the sodium silicate deposits as a gelatinous film upon the fibers. The packing is then immersed in a boiling 10% solution of calcium chloride for a period of 1 hour whereupon the wet body withdrawn is now firm and semi-rigid by precipitation of the silicate as calcium silicate. The body is then immersed in water to rinse out sodium chloride residues and is finally slowly dried in an air oven at 110° C. for two hours. It is found to be a rigid, mechanically strong and stable exchanger packing. It can be wet with lithium chloride as a hydroscopic solution and used as a moisture absorbent body.

EXAMPLE II

The wet waterglass impregnated green packing of Example I is immersed in an ethanol solution of soluble intermediate melamine aldehyde resin for a 20 minute period whereby most of the water contained in the waterglass is absorbed in the wetting solution, the waterglass besides becoming thick and gelatinous is impregnated with the melamine aldehyde, the treated packing is then dipped in dilute 5% hydrochloric acid to further set the silica gel as hard silicic acid and the film packing is dried in an air oven at 150° C. to remove the water from the silica gel and set the melamine resin in situ.

EXAMPLE III

The exchanger packing of Example I is formed as a mixture of asbestos fiber pulp with paper pulp, dried, corrugated and wound into a spiral body as in Example I. The packing is then immersed in 15% waterglass, reimmersed in acetone and finally is boiled in a 5% aluminum chloride solution for one hour, withdrawn and evaporated to dryness. It is found that the packing is structurally strong by being impregnated with a set coating of aluminum silicate, the evaporation to dryness in the presence of moist aluminum chloride destroying the residual cellulose. The product may again be immersed in water to extract residual soluble salts and finally redried as a firm, structurally strong packing.

EXAMPLE IV

The procedure of Example I is repeated except that a concentrated 20% solution of sodium chloride is substituted for the alcohol to remove large quantities of water from the waterglass, whereby a firm gel remains. The procedure for generally treating the packing is otherwise the same as in Example I.

As thus described, a firm packing is made of inorganic fiber such as asbestos which may be mixed with organic fiber such as cellulose or paper, the packing being impregnated with a stiffening and/or bonding solution, preferably a silicate in a series of steps in which the first stiffening-bonding solution such as impregnation with waterglass is followed by treatment of the solution wet packing to convert the coating or waterglass to a firm gelatinous form by extracting water, leaving the bonding solution or waterglass in a thickened but still reactive state. The waterglass is then precipitated to insoluble silicate with a precipitating salt solution, alone or combined with organic resinous binder substances.

Various modifications will occur to those skilled in the art. The intermediate solution for converting the waterglass to firm reactive gelatinous form may be with a water miscible organic solvent or a strong salt solution into which the water of a bonding solution such as waterglass will migrate. Any soluble silica precipitating salt may be used in the final setting solution for reacting with the firm gelatinous silica coating to leave a residual insoluble silicate salt coating upon the inorganic fiber.

Accordingly, it is intended that the description given hereinabove be regarded as exemplary and not limiting.

What is claimed is:

1. The method of forming a fibrous heat and moisture transfer body comprising assembling fibrous sheets into a laminated structure having a plurality of gas permeable cells passing therethrough, wetting the assembled body with an aqueous solution of waterglass, contacting the waterglass-wet fibrous body with a water absorbing liquid in which the waterglass is insoluble to remove water from the first applied solution and leave a dewatered stiffened coating on said fibers, and then reacting the residual coating upon said fibers with a setting agent to harden the same to stable form.

2. The method of claim 1 wherein the dewatering solution is a volatile organic water miscible solvent in which the waterglass is insoluble.

3. The method of claim 1 wherein the dewatering solution is a concentrated aqueous alkali metal salt solution in which the waterglass is insoluble.

4. The method of forming an inorganic fibrous heat and moisture transfer body comprising assembling inorganic fibrous sheets into a laminated structure having a plurality of gas permeable cells extending therethrough, wetting the assembled body with an aqueous solution of waterglass, dipping the wet waterglass impregnated body in a dewatering water miscible liquid in which the waterglass is insoluble to leave a gelatinous waterglass concentrate as a coating upon said fibrous body, and finally reacting the coating upon said fibrous body with an aqueous solution of a waterglass insolubilizing agent.

5. The method of claim 4 wherein the dewatering agent is a volatile water miscible organic solvent.

6. The method of claim 4 wherein said dewatering liquid is a lower alkanol.

7. The method of claim 4 wherein said dewatering liquid is acetone.

8. The method of claim 4 wherein the dewatering liquid is a concentrated aqueous solution of an alkali metal salt.

9. The method of claim 4 wherein the dewatered gelatinous waterglass coated fibrous body is reacted with an aqueous salt solution of an insoluble silicate forming metal.

10. The method of claim 4 wherein the dewatered gelatinous waterglass coated fibrous body is reacted with an aqueous salt solution of an insoluble silicate forming metal of the group consisting of calcium, magnesium, aluminum and zinc, tin, cobalt, chromium, iron and copper.

11. The method of claim 4 wherein the final reaction salt gelatinous waterglass coated fibrous body is reacted by boiling with an aqueous salt solution of an insoluble silicate forming metal.

12. The method of claim 10 wherein the inorganic fibrous body comprises asbestos.

13. The method of forming a fibrous heat and moisture transfer body comprising assembling asbestos into a laminated structure having a plurality of gas permeable cells extending therethrough, wetting the assembled body with an aqueous solution of waterglass, concentrating and thickening the wet waterglass impregnated body in a dewatering liquid to leave a gelatinous waterglass concentrate as a coating upon the asbestos fibers, and reacting the thickened waterglass coated asbestos body with a waterglass precipitant to convert the same to water-insoluble silicate.

References Cited

UNITED STATES PATENTS

| | | | |
|---|---|---|---|
| 1,898,345 | 2/1933 | Denning | 117—169 X |
| 2,354,351 | 7/1944 | Schuetz | 117—126 X |
| 2,989,418 | 6/1961 | Harbaugh | 117—62 X |
| 3,157,566 | 11/1964 | Brafford | 117—63 X |
| 3,239,459 | 3/1966 | Patterson | 23—312 X |
| 3,377,225 | 4/1968 | Munters | 117—126 |

FOREIGN PATENTS 783,071    9/1957    Great Britain.

WILLIAM D. MARTIN, Primary Examiner

D. COHEN, Assistant Examiner

U.S. Cl. X.R.

117—62, 63, 70, 126, 169; 161—137, 205